Oct. 17, 1933.　　　　A. M. JONES　　　　1,931,471
METHOD OF HARVESTING LETTUCE SEED
Filed Sept. 10, 1928　　　3 Sheets-Sheet 2
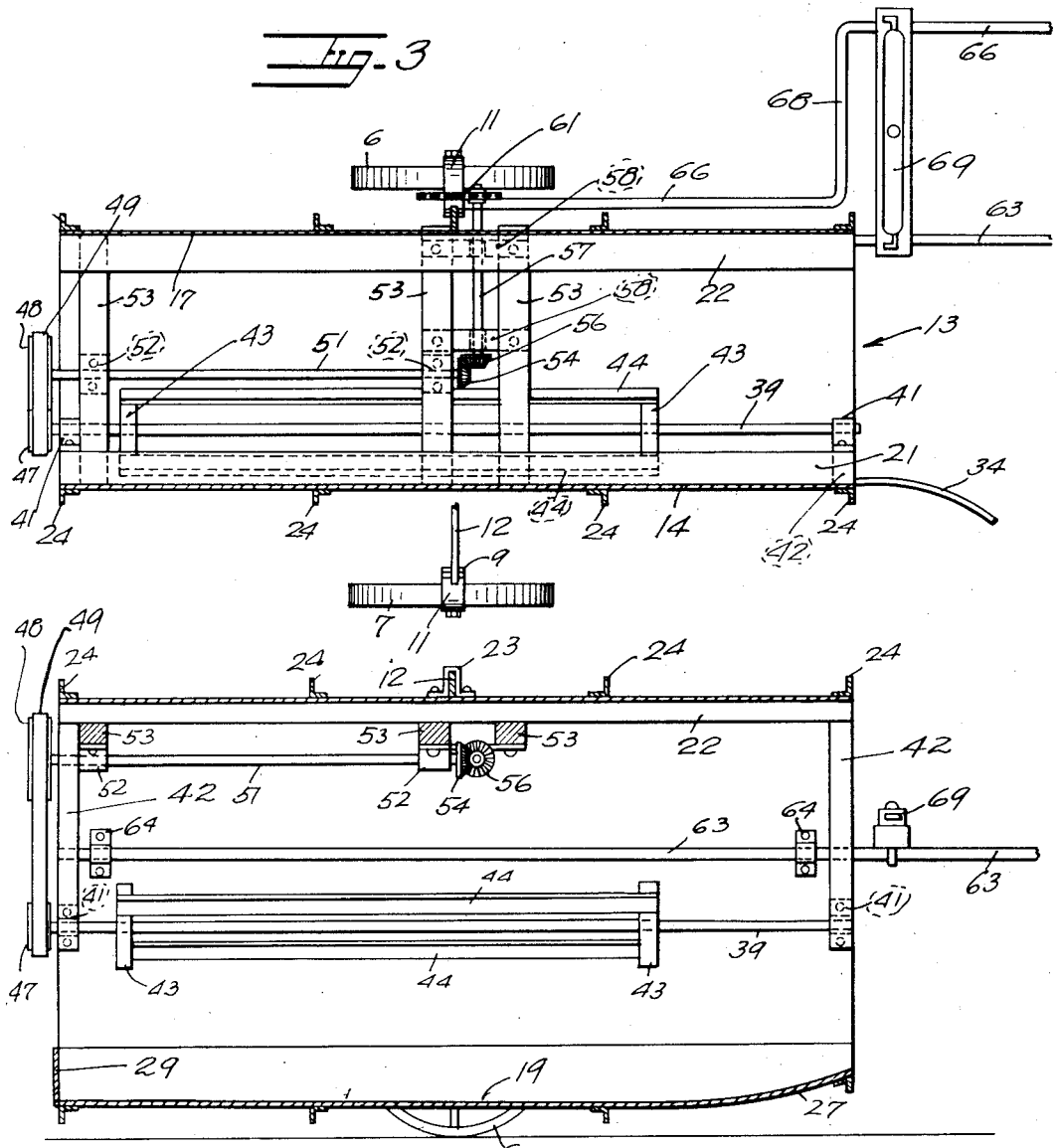
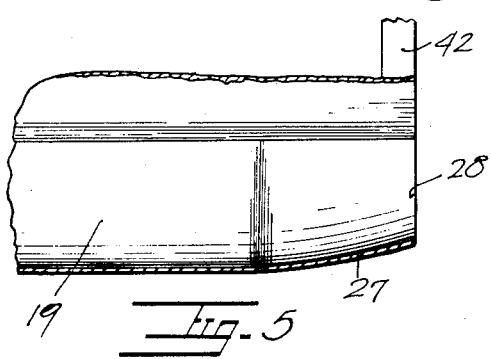
INVENTOR.
ALBERT M. JONES
BY
Harry C. Schroeder
ATTORNEY Oct. 17, 1933.  A. M. JONES  1,931,471
METHOD OF HARVESTING LETTUCE SEED
Filed Sept. 10, 1928    3 Sheets-Sheet 3
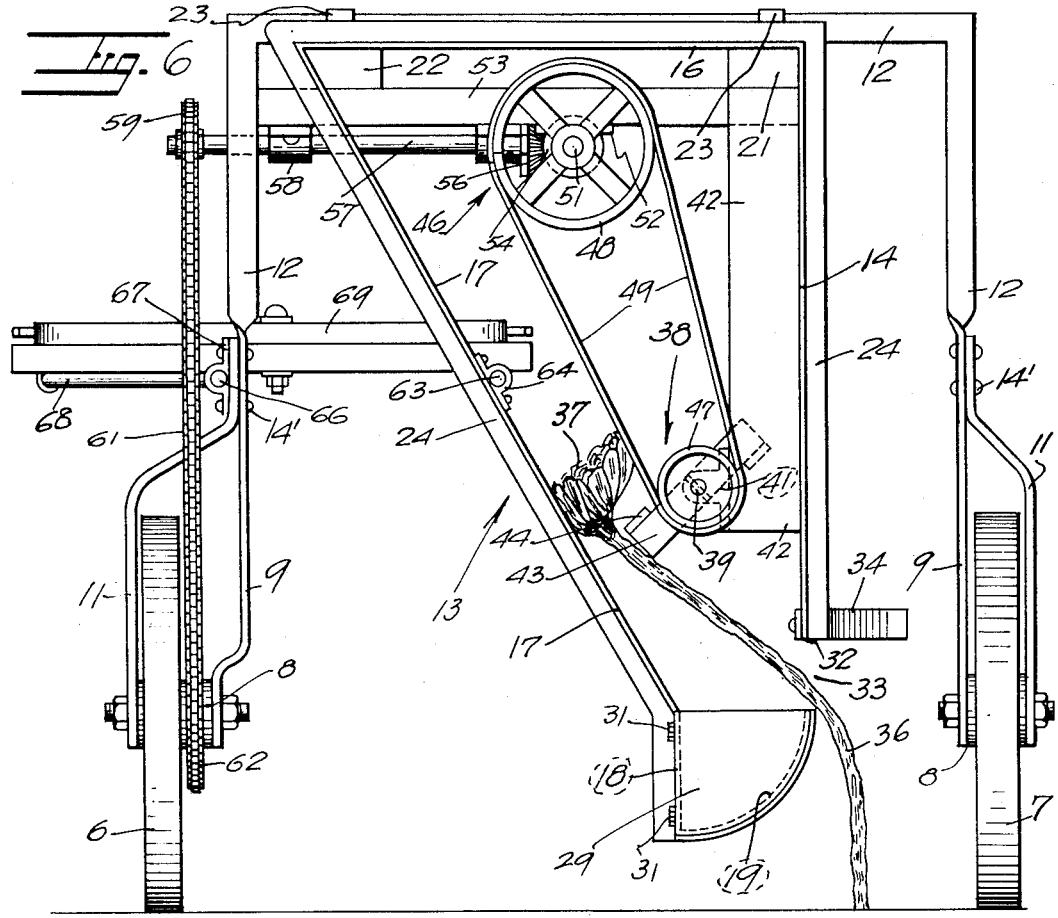
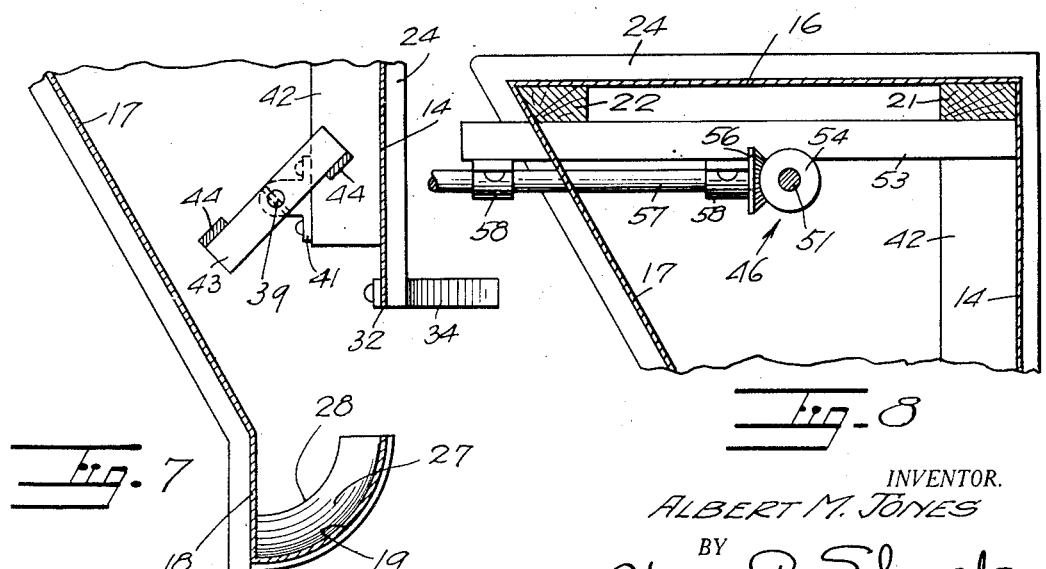
INVENTOR.
ALBERT M. JONES
BY
Harry C. Schroeder
ATTORNEY Patented Oct. 17, 1933

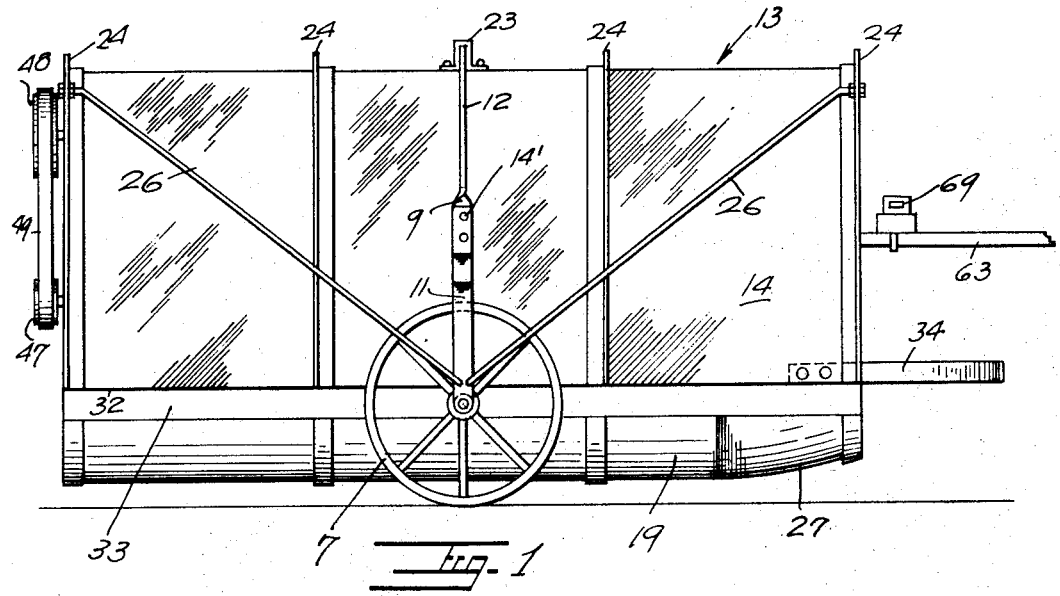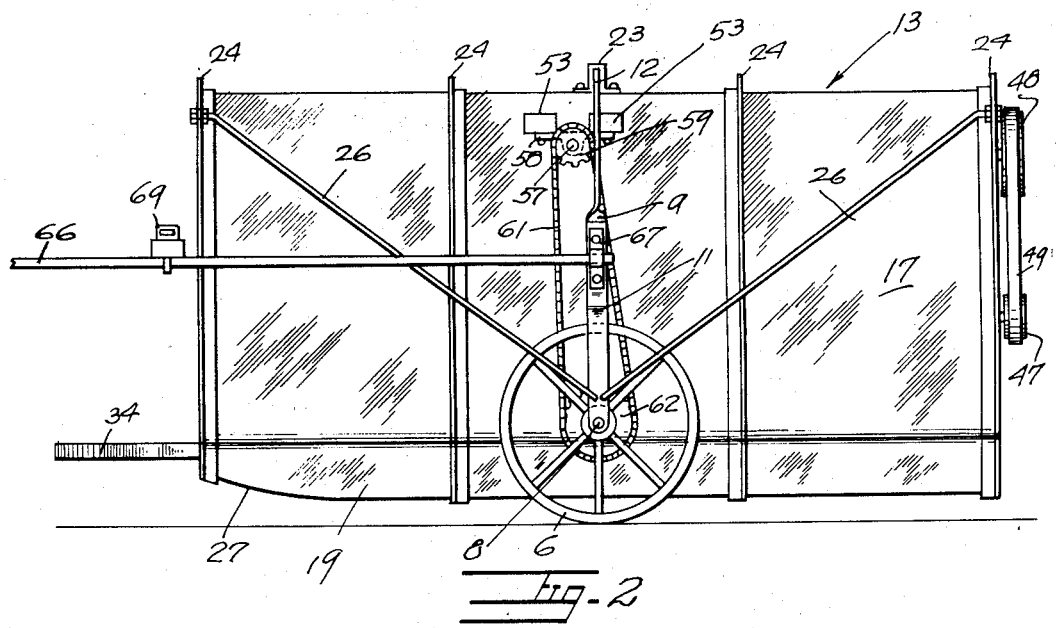

1,931,471

UNITED STATES PATENT OFFICE 1,931,471

METHOD OF HARVESTING LETTUCE SEED

Albert M. Jones, Oakland, Calif.

Application September 10, 1928
Serial No. 304,901

2 Claims. (Cl. 56—126)

The invention forming the subject matter of this application relates to a seed harvester for use in removing the seeds from the head of a plant, such as heads of lettuce.

There is lettuce cultivated especially for its seed, and at the present time, the harvesting of the seed is accomplished manually by shaking each individual lettuce head so that the ripe seeds therefrom are collected in a container held below the head. This manual method of harvesting lettuce seeds is very slow and inefficient.

The primary object of the present invention is to provide a method and device by which the harvesting of the seeds may be mechanically accomplished in a wheeled body traveling alongside the row of lettuce plants, the harvesting being accomplished without harm to the plants.

Another object of the invention is the provision of a harvester by which the stalk of the lettuce is bent without injury to the plant, and in such a manner as to bring the entire seed-containing portion of the plant (in the present case, the lettuce head) within the harvester device, wherein the seeds are removed from the lettuce head; the plant being released after the harvester is drawn past.

Another object of the invention is the provision of a seed harvester in which a wheeled body is provided to travel alongside the row of lettuce plants, the wheeled body having means thereon to bend the stalk of the lettuce plant so that the lettuce head is disposed in the interior of the harvester machine and in the proximity of a mechanical beater by the action of which the stalk is bent so that the lettuce head is forced against a wall of the harvester, then momentarily released, the bending and releasing being repeatedly performed while the carriage travels thereover; whereby the ripe seed is removed from the lettuce head; means being provided in the wheeled body to collect the seed removed from the lettuce head at a place wherefrom it may be conveniently withdrawn from the harvester, the wheeled body being so designed that the lettuce head is released from the said body after the harvester passed beyond the plant.

A further object of the invention is the provision of a harvester adapted to travel alongside the row of lettuce plants and adapted to bring the lettuce heads into the interior of the wheeled body in operative proximity of a rotary beater in said body; means being provided to transmit rotary motion from one of the wheels of said body to the rotary beater, the wheel from which the propulsion of the beater is transmitted being preferably on the side of the body opposite where the lettuce is introduced into the body.

Another object of the invention is to provide a harvester in which a wheeled body is adapted to travel alongside a row of lettuce and is adapted to bring the lettuce heads into the interior of the wheeled body, wherein the seed is removed from the lettuce head by repeatedly bending and releasing the stalk of the lettuce by means of a rotary beater driven by a wheel of the harvester body, and in which traction means are provided for moving the wheeled body, said traction means being offset to one side of the body so as to prevent injury to the lettuce. The traction means in the present instance are means for hitching a horse at one side of the front of the wheeled body.

A still further object of the invention is the provision of a wheeled body in which the sides are so formed that when a lettuce head is introduced therethru and is acted upon by a rotary wheel, the lettuce head is repeatedly knocked against a properly slanting side thereof, whereby the ripe seed is removed from the lettuce head, and is directed to a conveniently positioned trough in said wheeled body so that the collection of the seed is greatly facilitated.

Other objects of the invention are to provide a device of the character described that will be superior in point of simplicity, inexpensiveness of construction, positiveness of operation, facility and convenience in use, and general efficiency.

In this specification and the annexed drawings, the invention is illustrated in the form considered to be the best, but it is to be understood that the invention is not limited to such form because it may be embodied in other forms; and it is also to be understood that in and by the claims following the description, it is desired to cover the invention in whatsoever form it may be embodied.

In the drawings:

Figure 1 is a side elevation of the harvester;

Figure 2 is a side elevation of the harvester, viewing the same from the side on which the beater driving mechanism is positioned;

Figure 3 is a plan view of the device;

Figure 4 is a side elevation of the device, the side thereof being removed, so as to show the arrangement of the beater mechanism and the driving mechanism therefor;

Figure 5 is a fragmentary view of the trough or hopper in which the seed is collected;

Figure 6 is an end view of the harvester;

Figure 7 is a fragmentary sectional view, showing the relative position of the seed beater, the plant holder slot and the hopper or trough of the device; and Figure 8 is a fragmentary sectional view of the device, showing the transmission gearing for the rotary beater driving mechanism.

Referring, to the accompanying drawings, wherein similar reference characters designate similar parts thruout, the various figures described above adequately illustrate my invention, and the following detailed description is commensurate with the above mentioned drawings in enabling an artisan to construct and assemble the constituent parts of the same.

In carrying out my invention, I make use of wheels 6 and 7, the axles 8 of which are rotatably supported at the opposite ends thereof in brackets 9 and 11. The brackets 9 are the twisted ends of a U-shaped bar 12, the horizontal closed end of which supports a body, denoted in its entirety by the numeral 13. The brackets 11 are secured to the twisted ends 9 by means of rivets 14' or in any other conventional manner.

The body 13 comprises a sheet metal box formed from a single sheet metal plate, so bent that it forms a vertical side 14, a horizontal top 16, and inclined side 17, the latter being opposite the vertical side 14 and sloping toward said vertical side and extending therebelow. The end of the inclined side 17 is bent as at 18 so as to extend vertically and downwardly to a certain depth. The end of the vertical portion 18 is rebent in an arcuate shape so as to form a trough 19 extending thruout the full length of the body 13. The upper corners of the sheet metal box are reinforced by means of boards 21 and 22, the outer corners of which conform to the angularity of the respective corners of the sheet metal box. The boards 21 and 22 extend in the opposite corners from end to end. The whole body 13 is supported on the horizontal top member of the U-shaped bar 12 by means of ears 23 which are secured to the top of the sheet metal box and to the reinforcing boards 21 and 22, and which are disposed in alignment with each other so as to allow the supporting of the body 13 in the proper position upon the bar 12.

The outside of the sheet metal box is reinforced by means of bent angle iron bands 24 which follow the contour of the sheet metal box around the vertical side 14, top 16, and inclined side 17 thereof, but the angle adjacent to the vertical end 18 is stripped off and is bent out in an arcuate shape so as to form a supporting brace for the trough 19.

As shown in Figure 1, four angle iron bands are employed for reinforcing the body 13. Two of the bands are at the opposite ends of the box. The ends of the box are open. Outside of the box are provided diagonal bracing members 26 which extend between the brackets 9 and the extreme angle iron bands 24 disposed at the opposite ends of the body 13. It is to be noted that the trough 19 serves as a hopper, and the front end thereof is tapered as at 27 so as to form a small opening 28 at the front end of the harvester. The rear end of the trough 19 is covered by means of a swinging door 29 which is pivotally supported on hinges 31.

The vertical side 14 of the body 13 terminates in a horizontal edge 32, which edge is spaced from the trough 19 so as to form a longitudinal aperture 33 above the trough 19 thruout the length of the harvester body 13. At the front end of the edge 32 is a guide 34, secured upon the vertical side 14 in extension of the edge 32. The guide 34 is curved outwardly so that when the harvester body 13 is advanced alongside a row of lettuce, then the guide 34 will assist, in a manner to be hereinafter described, in bringing the lettuce head into the interior of the body 13.

It will be noted that between the wheels 6 and 7 depends the body 13, so that the aperture 33 is adjacent to the wheel 7. At the same time, the wheels are so spaced that two adjacent rows of lettuce are below the harvester without any danger of harm or injury to the plants. One row of plants is just inside of the wheel 7 and the other row is below the inclined side 17. The harvester is used for harvesting seed from any plant in which the seed is produced in the head of the plant. Such a plant is a lettuce plant, illustrated in Figure 6 and comprising a stalk 36, on the end of which is a lettuce head 37, which is specially grown for seeding.

The harvester is carried alongside a row of lettuce in such a manner that the curved guide 34 may readily engage the stalk 36 so as to gradually bend the same without any harm to the plant. Thus, the gradually bent stalk 36 is guided into the slot 33, engaging the lower edge 32 of the vertical side 14. Now, the lettuce head 37 is in the interior of the body member 13, and the seeds are removed therefrom by knocking and shaking the head 37, the seeds thus removed being guided by the inclined side 17 into the trough 19, from which they may be readily removed thru the opening normally covered by the swinging door 29. After the harvster passes over the lettuce, the lettuce is released at the rear end of the aperture 33, so that the stalk 36 may assume an upright position. It is also apparent that it depends on the length of the body 13 how many lettuce heads are handled at a time, because according to the spacing of the lettuce heads, there may be a plurality of lettuce heads 37 guided into the interior of the body 13, while the latter travels thereover.

The harvesting of seeds from the lettuce head 37 is accomplished by means of a rotary beating mechanism, denoted in its entirety by the numeral 38. The beating mechanism 38 comprises a shaft 39 extending in parallelism with the vertical side 14, the opposite ends thereof being rotatably supported in bearing brackets 41, which bearing brackets in turn are secured to end boards 42. It is to be understood that the bearing brackets can be made of a unitary character of any type and secured to the vertical sides 14. Upon the shaft 39 are fixedly secured, in spaced relation to each other, bars 43, the opposite ends of which extend to an equal distance from the center of the shaft 39. Upon the opposite ends and on the opposite sides of the bars 43 are secured beating blades 44 extending from one end bar to the other end bar 43, and being made of such length and so disposed that when the shaft 39 is rotated, and the bars 43 are rotated therewith, then the beating blades 44 will strike and further bend the lettuce stalk 36.

It is apparent that when one of the blades 44 bends the stalk 36, the head will be moved downwardly away from the edge 32, and knocked against the inclined side 17. Then the said beating blade 44 passes beyond the head 37, causing the release of the head; and the natural resiliency of the stalk 36 will cause the upper end of the stalk to straighten slightly before the next blade acts thereupon. The repeated knocking of the lettuce head against the side 17, and the releasing of the same, effectively shakes the ripe seeds out of the lettuce head 37. The seeds which are loosened and removed from the lettuce head 37 are guided by the inclined side into the trough 19. This operation of knocking and releasing the lettuce head 37 is performed repeatedly and at a rate depending upon the rate of rotation of the beating mechanism 38. The lettuce head 37 is knocked against the inclined side 17 twice in every revolution of the mechanism 38. It is also to be noted that a plurality of lettuce heads may be simultaneously harvested by the beater mechanism, depending on the length of the body 13 and the spacing of the lettuce plants from each other.

The rotation of the beating mechanism 38 is accomplished thru a gear transmitting mechanism, designated in its entirety by the numeral 46, the mechanism being driven by the wheel 6. The rear end of the shaft 39 extends beyond the end of the harvester body 13 and carries a pulley 47 which is connected to a driving pulley 48 by means of a belt 49. The driving pulley 48 is fixedly secured upon the end of an upper shaft 51, extending thru bearings 52, which bearings are supported on transverse frame members 53. The transverse frame members 53 extend below the reinforcing boards 21 and 22 and are secured thereto in the usual manner.

The shaft 51 extends to the central portion of the top 16, and it has a beveled gear 54 thereon, which is constantly in mesh with a driving beveled gear 56 on a transverse shaft 57, which latter shaft extends thru the inclined side 17 and is supported on bearings 58, which bearings in turn are supported on two adjacent transverse members 53. On the other end of the transverse shaft 57 is a sprocket 59, which is connected by means of a chain 61 to a driving sprocket 62 on the axle 8 of the wheel 6. This driving mechanism may be connected to either one of the wheels 6 or 7, but it is preferable and more practical to have the driving mechanism connected to the wheel 6 which is disposed outside of the inclined side 17, so that the driving mechanism does not interfere with the guiding and the beating of the plant. There is a row of plants between the wheel 6 and the inclined side 17, so that there are two rows of plants between the wheels 6 and 7.

In operation, the lettuce stalks 36 and the heads 37 are brought into the interior of the harvester body 13 in the manner heretofore described. During the advancement of the harvester body 13, the rotation of the wheel 6 transfers rotation thru the sprockets 62, chain 61, and the sprocket 59 to the shaft 57, which, in turn, rotates the gear transmission 46, from which the rotation is transmitted by means of the pulleys 48 and belt 49 to the pulley 47 and the shaft 39. The bars 43 and the blades 44 are then rotated with the shaft 39 and shake the lettuce heads 37 in the manner heretofore described.

The harvester machine is drawn in a manner customary in connection with agricultural vehicles. A shaft 63 is secured to the inclined side 17 in a bracket 64, as shown in Figure 6, while the other shaft 66 is secured in a bracket 67, which bracket 67 is secured upon the twisted portion 9 of the U-shaped bar 12. The shaft 66 is bent away from the shaft 63 at right angles, as shown at 68, and then rebent in parallelism with the shaft 63 so that an animal may be harnessed between the shafts and at one side of the harvester. The usual whiffle-tree 69 is provided between the shafts 63 and 66, to which the traces of an animal harness are connected, and whereby the harvester is drawn. The shafts are disposed at one side of the harvester in order to keep the animal drawing the harvester at a distance from the rows of lettuce between the wheels, thereby obviating any injury to the lettuce plants. Although the particular drawing means for the harvester is illustrated as the type used in connection with animal power, it is understood that the harvester may be drawn by a tractor or any other similar farm implement.

It will be recognized that a particularly compact and efficient harvester is provided, in which the stalk of a plant is introduced into the interior of a harvester in a novel manner so as to prevent any harm to the plant, and in which the entire seed-containing portion of the plant is shaken within the harvester without injury to the plant. The ripe seed is removed speedily and efficiently by a mechanical rotary beater. After the harvester passes over the plant, the same is released and resumes its natural position.

It will also be recognized that the rate at which the rotary beater operates is regulated by the speed of advancement of the harvester, because the bearing mechanism is driven by power conveyed from a wheel of the harvester. In the harvester, the angle of the side against which the seed is knocked is adapted to allow the gravity travel of the seed to the trough. The wheels and the drawing means of the harvester are so related as to allow the driving of the same in proper relation to the rows of plants therebetween. The harvesting is thus accomplished more efficiently in less time, and a complete and thorough collection of seed is effected with no injury or harm to the plant.

The device is of a unitary character. It requires no careful setting up; therefore, it lends itself to effective application by the labor ordinarily available.

I claim:

1. The method of harvesting lettuce seed which consists in bending the lettuce head over a receptacle within an enclosure, moving the receptacle and continuously beating the head against a reactive surface, the enclosure directing the seed into the receptacle.

2. The method of harvesting lettuce seed without removing the stalk from the ground consisting in passing the lettuce stalk through a passage, bending the lettuce head over one side of the passage, and maintaining the head bent and continuously beating the head against a reactive surface throughout its entire movement through the passage.

ALBERT M. JONES.